United States Patent [19]

Nagasaki

[11] Patent Number: 4,760,839
[45] Date of Patent: Aug. 2, 1988

[54] MESH PATTERN ERASER FOR ENDOSCOPE

[75] Inventor: Tatsuo Nagasaki, Musashino, Japan

[73] Assignee: Olympus Optical Co., Ltd., Tokyo, Japan

[21] Appl. No.: 922,801

[22] Filed: Oct. 24, 1986

Related U.S. Application Data

[63] Continuation of Ser. No. 657,272, Oct. 3, 1984, abandoned.

[30] Foreign Application Priority Data

Oct. 3, 1983 [JP] Japan ............................... 58-184682

[51] Int. Cl.[4] ........................... A61B 1/06; H04N 9/04
[52] U.S. Cl. ......................................... 128/6; 350/401
[58] Field of Search ......................................... 128/4–6; 350/96.24–96.26, 116.12, 400, 401, 403, 448; 358/75

[56] References Cited

U.S. PATENT DOCUMENTS

| | | | |
|---|---|---|---|
| 2,275,602 | 3/1942 | Beck et al. | 350/448 |
| 2,484,003 | 10/1949 | Simison | 350/96.24 |
| 3,110,762 | 11/1963 | Frank | 350/96.25 |
| 3,449,037 | 6/1969 | Koester | 350/96.25 |
| 3,554,632 | 8/1966 | Chitayat | 350/96.25 |
| 3,588,224 | 6/1971 | Pritchard | 350/404 |
| 3,716,666 | 6/1971 | Larsen | 350/162.12 |
| 3,740,115 | 6/1973 | Cole | 350/96.26 |
| 3,756,695 | 9/1973 | Mino et al. | 350/448 |
| 4,072,147 | 2/1978 | Hett | 128/6 |
| 4,154,502 | 5/1979 | Siegmund | 350/96.25 |
| 4,227,208 | 10/1980 | Takanashi et al. | 350/404 |
| 4,247,165 | 1/1981 | Versluis | 350/96.24 |
| 4,341,442 | 7/1982 | Johnson | 350/311 |
| 4,575,193 | 3/1986 | Greivenkamp, Jr. | 350/401 |
| 4,587,553 | 5/1986 | Watanabe et al. | 350/401 |
| 4,626,897 | 12/1986 | Sato et al. | 350/404 |
| 4,676,593 | 6/1987 | Adachi et al. | 350/311 |

OTHER PUBLICATIONS

"Formation of a Smooth Transverse Distribution of Intensity in a Light Beam by a Phase Rotating Slate" by Papernyi et al.; Kvantovaya Elektron (Moskow) 5, 2059–2060; 9/78.

"Tunable Spatial Filtering with Fabry–Perotetalon" by G. Indebetouw Applied Optics, Mar. 1, 1980, vol. 19 #5, pp. 761–764.

Primary Examiner—Lee S. Cohen
Assistant Examiner—David Shay
Attorney, Agent, or Firm—Armstrong, Nikaido, Marmelstein & Kubovcik

[57] ABSTRACT

Equipment to erase the mesh pattern caused by the arrangement of the optical fibers in an endoscope which uses the optical fiber bundle as an image transferring means. This equipment erases the mesh pattern without decreasing the resolution by providing optical low pass filters to cut off the spatial frequency component higher than the resolution which is specified by the arrangement of the optical fibers on both sides of the image transferring means.

27 Claims, 3 Drawing Sheets (a)

(b)

MESH PATTERN ERASER FOR ENDOSCOPE

This application is a continuation of application Ser. No. 657,272 filed Oct. 3, 1984, now abandoned.

BACKGROUND OF THE INVENTION

This invention concerns a mesh pattern eraser for an endoscope which can eliminate the mesh pattern observed when a bundle of optical fibers arranged in a regular pattern is used for an image guide or image transferring means.

Recently a medical endoscope has been widely used which makes it possible to observe or diagnose an affected part, etc. in the human body without necessity of incision by inserting a long and narrow and flexible inserting member into the body through the mouth or to perform medical treatment using forceps and scalpel.

Also, in the industrial field, the industrial endoscope is used for the inspection of damaged parts of the inner wall of the piping in a plant or foreign matter sticking to the inner wall.

The medical endoscope is normally constructed with a soft inserting member which can be inserted through a crooked passage, and is so designed that a subject such as an affected part can be illuminated by an illuminating means which irradiates light from the end of the inserting member. An image is-formed at one end face of the image guide, constituting an image transferring means made of a flexible optical fiber bundle, by means of the image-forming optical system, transferred to the other end face at hand through the image guide, and enlarged and observed through the eye lens system.

But since the image guide means uses a bundle of fibers arranged in a regular pattern as an image transferring means, the spaces between the adjacent fibers become dark because they do not transfer the light, and a mesh pattern is observed when the image is observed through the eye lens system, thus making it difficult to see the image and also the high-frequency component of the mesh pattern makes the image indistinct.

BRIEF SUMMARY OF THE INVENTION

The objective of this invention is to provide a mesh pattern eraser for an endoscope which can eliminate the mesh pattern caused by the arrangement of the fibers.

Another objective of this invention is to provide a mesh pattern eraser for an endoscope which can eliminate the mesh pattern effectively without decreasing the resolution.

Still another objective of this invention is to provide a mesh pattern eraser for an endoscope which can be made as a simple structure.

A further objective of the invention is to provide a means at the image receiving end of the image guide to prevent the image from becoming indistinct, due to interference, by cutting off in advance frequency components of the image above the spacial frequency resolution of the image guide.

Other features and advantages of this invention will be made clear by the following explanation.

BRIEF DESCRIPTION OF THE DRAWINGS

FIG. 1 is an explanatory diagram to show an endoscope using the preferred embodiment;

FIG. 2 is a side view to show a quartz plate used to form the optical low pass filter;

FIG. 3 a characteristic diagram to show the luminance characteristics of the quartz plate as a function of spatial frequency;

FIG. 4 a characteristic diagram to show the luminance characteristic when n thickness pieces of the quartz plates shown in FIG. 2 are used;

FIG. 5 (a) an explanatory diagram to show the fiber row and luminance distribution;

FIG. 5 (b) a distribution diagram to show distribution of the spatial frequencies in FIG. 5 (a);

FIG. 6 (1) a distribution diagram to show luminance distribution of a subject image;

FIG. 6 (b) a distribution diagram to show distribution of spatial frequencies in FIG. 6 (a);

FIG. 6 (c) a distribution diagram to show luminance distribution of a subject image passed through the fiber row;

FIG. 6 (d) a distribution diagram to show the spatial frequency distribution in FIG. 6 (c);

FIG. 7 a front view to show a two-dimensional arrangement of fibers to form the image guide; and FIG. 8 a perspective side view to show an optical low pass filter to be used in the embodiment of FIG. 1.

DETAILED DESCRIPTION OF THE PREFERRED EMBODIMENT

Figure 1:
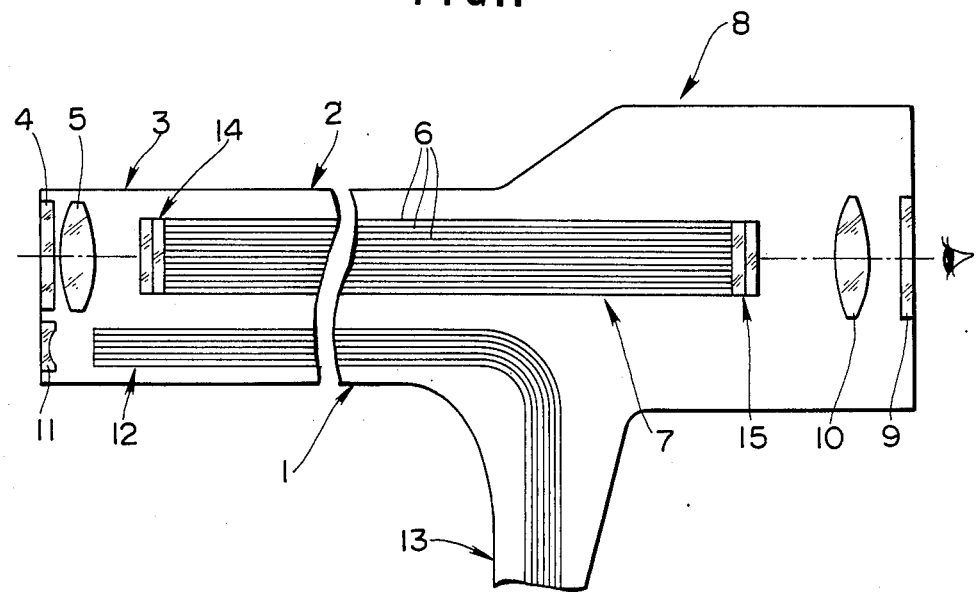
FIGS. 1 to 8 concern the preferred embodiment of this invention.

The soft type endoscope 1 provided with an eraser as shown in FIG. 1 has a hard end part 3 permanently installed on the front end of the long and narrow and flexible inserting member 2, with the observation window of said end part 3 closed with a cover glass 4 and an image-forming lens 5 provided inside. A flexible image guide 7 made of a bundle of optical fibers 6 arranged in a regular pattern is provided at the position where its front end face (receiving end face) comes at the focal plane of the image-forming lens 5, and the said image guide 7 as an image tranferring means is extended through the inserting member 2 to the operating part 8 on the rear end of the endoscope to transfer the image formed at the receiving end face to the rear end face (outgoing end face). The image at the outgoing end face can be enlarged and observed through the eye lens 10 provided inside the cover glass which closes the eye lens window.

Adjacent to the above optical system for observation an illuminating means is provided.

The illuminating window of the end part 3 is closed with a light distributing lens 11 and inside it a light guide 12 made of a flexible optical fiber bundle is provided. This light guide 12 is passed through the inserting member 2, bent at a place near to the operating part 8, passed through the light guide cable 13 which is extended outside, and can be removably connected to a light source equipment (not illustrated), to transfer the illuminating light in the light source equipment and to illuminate a subject within the image-forming range of the image-forming lens 5 from the front end face of the light guide 12 through the light distributing lens 11.

To the receiving end face and outgoing end face of the said image guide 7, optical low pass filters 14 and 15 are attached as a means to erase the mesh pattern which is created by the arrangement of the fibers 6 to form the said image guide 7.

Figure 2:
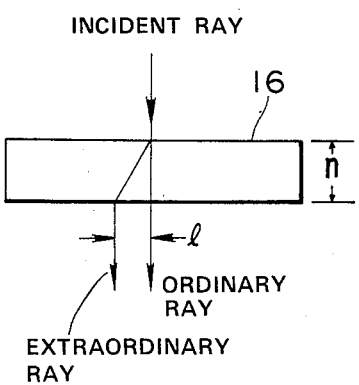

The optical low pass filters 14 and 15 are made by cutting a transparent material such as calcite or mica like the quartz plate 16 in FIG. 2 which has a double refraction characteristic, i.e. light transmitted is separated into an ordinary ray and extraordinary ray. This material is cut into a plate having a thickness such that the pitch of the divergence after transmission will be a proper value l as illustrated.

Figure 3:
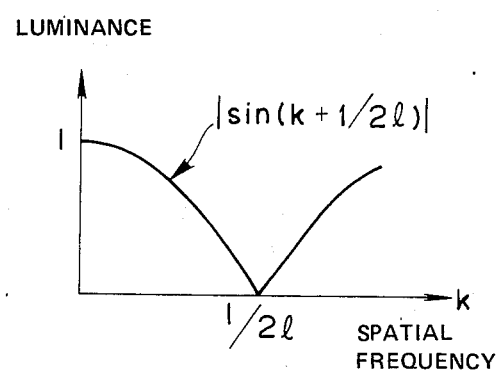
Figure 4:
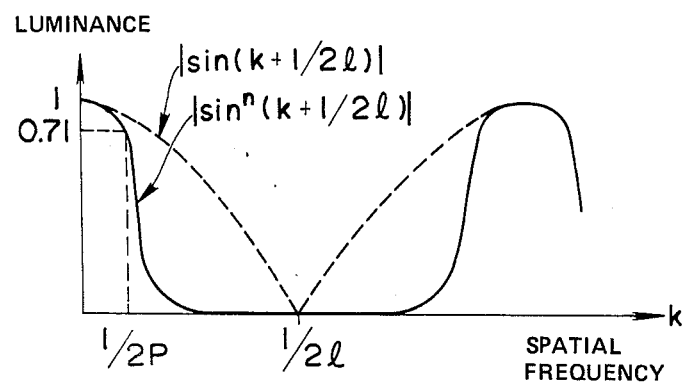
Figure 8:
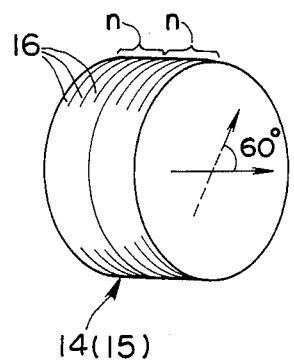

The luminance change as a function of the spatial frequency k (divergence pitch direction) of the quartz plate 16 with the divergence pitch l is such that the response becomes 0 when the spatial frequency is 1/(2 l) as shown in FIG. 3, and the cutoff characteristic of the optical low pass filter is moderate. Therefore, as the optical low pass filters 14 and 15, n thickness of the quartz plate 16 in FIG. 2 which show sharp cutoff characteristic as shown in FIG. 4 are used. In order to erase the mesh pattern two-dimensionally, 2 sets of n thickness of quartz plates 16 are prepared and used together as the optical low pass filter 14 or 15 in such an arrangement that the double refraction occurrence directions of the two plates are diverged 60 degrees, as shown in FIG. 8.

The divergence pitch l of the quartz plates 16 to form the optical low pass filter 14 or 15 is set as follows.

Figure 5:
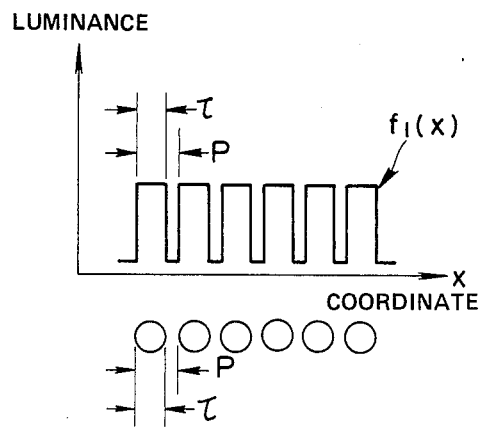
Figure 5:
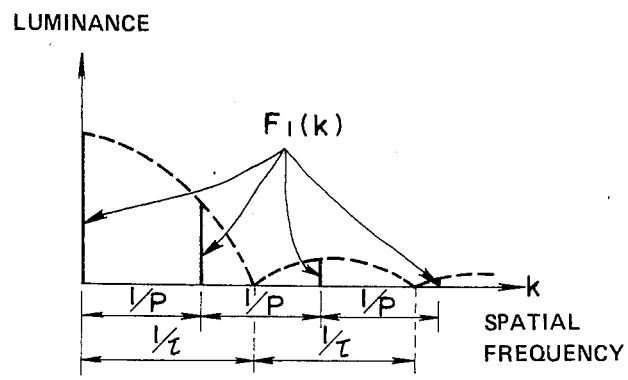

The horizontal arrangement of the fibers 6 to form the image guide 7 is as shown below FIG. 5 (a). If the diameter of the fiber is $\tau$ and the arrangement pitch is P, the luminance change of the mesh pattern $f_1(x)$, a regular pattern of bright parts and dark parts, which is created when uniform light is seen through the fibers arranged horizontally (coordinates in the horizontal direction are expressed by x) will be as shown above. In FIG. 5 (a), and for the spatial frequency $F_1(x)$ bright-line spectra are created on the basis of the mesh pattern $f_1(x)$ as shown in FIG. 5 (b).

The said bright-line spectrum appears at the spatial frequency corresponding to the uniform brightness $k=0$ and also $k=1/P, k=2/P \ldots$ (the actual difference in distance between $1/P$ and $1/\tau$ is considerably smaller than illustrated).

Figure 6:
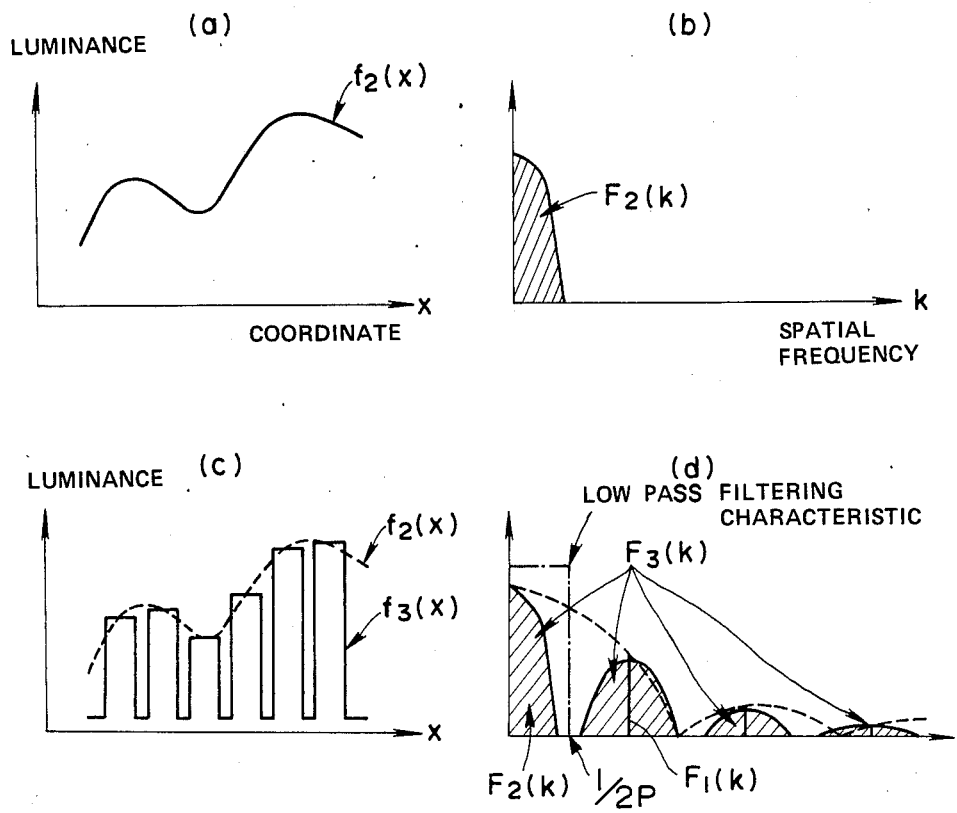

If an image whose luminance change is $f_2(x)$ as shown in FIG. 6 (a) and whose spatial frequency component is $F_2(k)$ as shown in FIG. 6 (b) is seen through the fiber row, the luminance change $f_3(x)$ will be as shown in FIG. (c) and the spatial frequency component $F_3(k)$ will be in accordance with frequency convolution theorem:

$$F_3(k) = \mathcal{F}\{f_3(x)\} = \mathcal{F}\{f_1(x)f_2(x)\}$$
$$= \mathcal{F}\{f_1(x)\} * \mathcal{F}\{f_2(x)\}$$
$$= F_1(k) * F_2(k)$$

($\mathcal{F}$ indicates Fourier transformation symbol and * indicates convolution integration), and as shown in FIG. 6 (d), the spatial frequency component $F_3(k)$ shown in FIG. 6 (b) appears on both sides of each bright-line spectrum. As clearly seen from this figure, the resolution limit of the fiber row is $1/(2P)$.

Therefore, in order to erase the mesh pattern without decreasing the resolution, a material with the optical low pass filtering characteristic that the cutoff frequency becomes $\frac{1}{2}P$ should be used, as shown in the long and short dash line in FIG. 6 (d).

Although it is impossible to realize the ideal cutoff characteristic as shown in FIG. 6 (d) with one quartz plate 16, approximately ideal filtering characteristic can be obtained by combining n thickness pieces of it as aforementioned. The characteristic of n thickness pieces of quartz plate 16 will be $|\sin^n(k+\frac{1}{2}l)|$ as shown in solid line in FIG. 4, and if k is set to the value 0.71 where the sharp falling off of the characteristic starts when $k=1/(2P)$, the pitch l can be obtained by $1/(2 l)=\sin^{-1}(^n\sqrt{0.71})-1/(2P)$.

Figure 7:
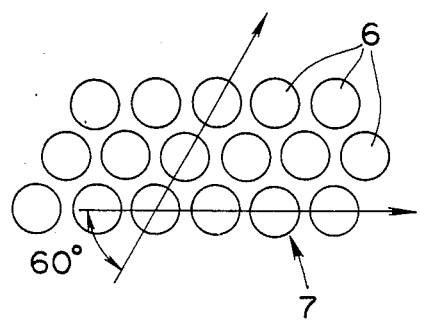

The above explanation concerns a one-dimensional horizontal arrangement, and actually the fibers in the image guide 7 are also arranged regularly in the direction at 60 degrees to the horizontal direction as shown in FIG. 7, and the embodiment 1 uses such optical low pass filters 14 and 15 as shown in FIG. 8 which have the aforementioned characteristic also in the direction at 60 degrees to the horizontal direction.

The reason why the optical low pass filter 14 with the same characteristic is provided at the receiving end face as well as at the outgoing end face of the image guide 7 is to cut off in advance the frequency component if there is a component higher than than the resolution limit $1/(2P)$ of the image guide 7 in the spatial frequency component of an image formed at the receiving end face (to prevent the image from becoming indistinct due to interference). (In FIG. 6 (b), the frequency component $F_2(k)$ is less than $1/(2P)$ to simplify the description, and this is interpreted as having passed the said optical low pass filter 14.)

As aforementioned, since the optical low pass filter 14 at the receiving end face of the image guide 7 forms an image with the frequency component less than the resolution limit $1/(2P)$ of the image guide and the optical low pass filter 15 provided at the outgoing end face cuts off any frequency component which produces the mesh pattern of the fiber arrangement of the image guide 7 and makes the image indistinct, the mesh pattern can be erased without decreasing the resolution.

As clear from the above explanation, this invention can be widely applied even to different arrangements of the fibers to form the image guide 7, so long as the fibers are arranged regularly, by setting the cutoff frequency to a proper value in accordance with the arrangement.

In the above embodiment, the optical low pass filters 14 and 15 are attached to the receiving end face and outgoing end face of the image guide 7, but if the focal lengths of the object lens 5 and eye lens 10 are taken into consideration, they can be provided away from the end faces.

As aforementioned, in one embodiment of this invention, at the end faces of the image guide made of a bundle of regularly arranged fibers, the optical low pass filters which pass only frequency components less than the spatial frequency, the resolution limit of the image guide, and the simple structure can erase the mesh pattern attributable to the fiber arrangement without decreasing the resolution.

It is clear in this invention that a wide range of embodiments can be formed on the basis of this invention without deviating from the spirit and scope of this invention. This invention is not limited to the particular embodiments except in accordance with the limitations described in the claims.

I claim:

1. An endoscope comprising:
   an inserting member having an inserted end and a rear end;
   an image guide composed of a bundle of optical fibers regularly arranged in a two-dimensional pattern having adjacent fibers linearly arranged along a plurality of axes and having a spatial frequency resolution determined by said linear arrangement, said image guide being arranged in said inserting member for transferring an optical image from said inserted end to said rear end;

an image forming optical system in said inserted end for creating an optical image on an image receiving end face of said image guide at said inserted end;

an eye lens optical system for observing said optical image at an exit end face of said image guide at said rear end; and a means in said endoscope to eliminate a mesh pattern in said observed image caused by said regularly arranged bundle of optical fibers, said means consisting of an optical low pass filter, having at least one transparent double refracting optical element of a thickness such that it passes only spatial frequency components lower than a predetermined spatial frequency, positioned at said exit end face of said image guide.

2. An endoscope as recited in claim 1 wherein said optical low pass filter is composed of a plurality of double refracting optical elements.

3. An endoscope as recited in claim 2 wherein said bundle of optical fibers two-dimensional pattern has adjacent fibers linearly arranged along axes forming a sixty degree angle and said optical elements of said low pass filter are oriented with their axes of double refraction in alignment with respective axes of said linear arrangements.

4. An endoscope as recited in claim 2, wherein said adjacent fibers linearly arranged along on axis have a pitch P and each said transparent double refracting optical element oriented in the direction of an axis has a thickness so as to have a spatial frequency resolution limit of 1/(2P) along said axis.

5. An endoscope as recited in claim 3 wherein said adjacent fibers linearly arranged along an axis have a pitch P and each said transparent double refracting optical element oriented in the direction of an axis has a thickness so as to have a spatial frequency resolution limit of 1/(2P) along said axis.

6. An endoscope as recited in claim 2 wherein each said double refracting optical element is made of quartz.

7. An endoscope as recited in claim 3 wherein each said double refracting optical element is made of quartz.

8. An endoscope as recited in claim 4 wherein each said double refracting optical element is made of quartz.

9. An endoscope as recited in claim 5 wherein each said double refracting optical element is made of quartz.

10. An endoscope comprising:

an inserting member having an inserted end and a rear end;

an image guide composed of a bundle of optical fibers regularly arranged in a two-dimensional pattern having adjacent fibers linearly arranged along a plurality of axes and having a spatial frequency resolution determined by said linear arrangement, said image guide being arranged in said inserting member for transferring an optical image from said inserted end to said rear end;

an image forming optical system in said inserted end for creating an optical image on an image receiving end face of said image guide at said inserted end;

an eye lens optical system for observing said optical image at an exit end face of said image guide at said rear end; and a means in said endoscope to cut off interference in said created optical image, said means consisting of an optical low pass filter, having at least one transparent double refracting optical element of a thickness such that it passes only spatial frequency components lower than a predetermined spatial frequency, positioned at said image receiving end face of said image guide, and low pass optical filter means at said exit end face of said image guide to eliminate a mesh pattern in an observed image.

11. An endoscope as recited in claim 10 wherein said optical low pass filter is composed of a plurality of double refracting optical elements.

12. An endoscope as recited in claim 11 wherein said bundle of optical fibers two-dimensional pattern has adjacent fibers linearly arranged along axes forming a sixty degree angle and said optical elements of said low pass filter are oriented with their axes of double refraction in alignment with respective axes of said linear arrangements.

13. An endoscope as recited in claim 11, wherein said adjacent fibers linearly arranged along an axis have a pitch P and each said transparent double refracting optical element oriented in the direction of an axis has a thickness so as to have a spatial frequency resolution limit of 1/(2P) along said axis.

14. An endoscope as recited in claim 12, wherein said adjacent fibers linearly arranged along an axis have a pitch P and each said transparent double refracting optical element oriented in the direction of an axis has a thickness so as to have a spatial frequency resolution limit of 1/(2P) along said axis.

15. An endoscope as recited in claim 11 wherein each said double refracting optical element is made of quartz.

16. An endoscope as recited in claim 12 wherein each said double refracting optical element is made of quartz.

17. An endoscope as recited in claim 13 wherein each said double refracting optical element is made of quartz.

18. An endoscope as recited in claim 14 wherein each said double refracting optical element is made of quartz.

19. An endoscope comprising:

an inserting member having an inserted end and a rear end;

an image guide composed of a bundle of optical fibers regularly arranged in a two-dimensional pattern having adjacent fibers linearly arranged along a plurality of axes and having a spatial frequency resolution determined by said linear arrangement, said image guide being arranged in said inserting member for transferring an optical image from said inserted end to said rear end;

an image forming optical system in said inserted end for creating an optical image on an image receiving end face of said image guide at said inserted end;

an eye lens optical system for observing said optical image at an exit end face of said image guide at said rear end; and means in said endoscope to cut off interference in said created image and to eliminate a mesh pattern in said observed image caused by said regularly arranged bundle of optical fibers, said means consisting of a first optical low pass filter positioned at said image receiving end face of said image guide and a second optical low pass filter positioned at said exit end face of said image guide, each of said optical filters having at least one transparent double refracting element of a thickness such that it passes only spatial frequency components lower than a predetermined spatial frequency.

20. An endoscope as recited in claim 19 wherein each of said low pass optical filters is composed of a plurality of double refracting optical elements.

21. An endoscope as recited in claim 20 wherein said bundle of optical fibers two-dimensional pattern has adjacent fibers linearly arranged along axes forming a sixty degree angle and said optical elements of said low pass filter are oriented with their axes of double refraction in alignment with respective axes of said linear arrangements.

22. An endoscope as recited in claim 20 wherein said adjacent fibers linearly arranged along an axis have a pitch P and each said transparent double refracting optical element oriented in the direction of an axis has a thickness so as to have a spatial frequency resolution limit of $1/(2P)$ along said axis.

23. An endoscope as recited in claim 21, wherein said adjacent fibers linearly arranged along an axis have a pitch P and each said transparent double refracting optical element oriented in the direction of an axis has a thickness so as to have a spatial frequency resolution limit of $1/(2P)$ along said axis.

24. An endoscope as recited in claim 20 wherein each said double refracting optical element is made of quartz.

25. An endoscope as recited in claim 21 wherein each said double refracting optical element is made of quartz.

26. An endoscope as recited in claim 22 wherein each said double refracting optical element is made of quartz.

27. An endoscope as recited in claim 23 wherein each said double refracting optical element is made of quartz.

* * * * *